United States Patent
Wu et al.

(10) Patent No.: US 11,171,959 B2
(45) Date of Patent: Nov. 9, 2021

(54) SELECTIVE BLOCKING OF NETWORK ACCESS FOR THIRD PARTY APPLICATIONS BASED ON FILE CONTENT

(71) Applicant: Dell Products L. P., Round Rock, TX (US)

(72) Inventors: Dongli Wu, Allen, TX (US); James Darrell Testerman, McKinney, TX (US); Venkata Satya Narasimha Murthy Prayaga, Piscataway, NJ (US); Ricardo Antonio Ruiz, The Colony, TX (US); Jonathan Nathan Yanez, Allen, TX (US); Luis Antonio Valencia Reyes, Garland, TX (US)

(73) Assignee: Dell Products L.P., Round Rock, TX (US)

( * ) Notice: Subject to any disclaimer, the term of this patent is extended or adjusted under 35 U.S.C. 154(b) by 630 days.

(21) Appl. No.: 16/054,408

(22) Filed: Aug. 3, 2018

(65) Prior Publication Data

US 2020/0045047 A1    Feb. 6, 2020

(51) Int. Cl.
    *G06F 7/04*         (2006.01)
    *H04L 29/06*      (2006.01)
    *G06F 16/93*      (2019.01)

(52) U.S. Cl.
    CPC .............. *H04L 63/10* (2013.01); *G06F 16/93* (2019.01); *H04L 63/0428* (2013.01); *H04L 69/169* (2013.01)

(58) Field of Classification Search
    CPC ... H04L 63/10; H04L 69/169; H04L 63/0428; H04L 63/20; H04L 63/0464; H04L 63/0263; H04L 63/0245; G06F 16/93; G06F 2221/2141; G06F 2221/629; G06F 2221/2115; G06F 21/00
See application file for complete search history.

(56) References Cited

U.S. PATENT DOCUMENTS

| | | | |
|---|---|---|---|
| 2004/0010701 A1* | 1/2004 | Umebayashi ....... | G06F 21/6227 713/193 |
| 2010/0306850 A1* | 12/2010 | Barile .................. | G06F 21/566 726/25 |

(Continued)

*Primary Examiner* — Trong H Nguyen
(74) *Attorney, Agent, or Firm* — Egan, Enders & Huston LLP.

(57) ABSTRACT

A system that implements a software tool for data leak prevention whenever a protected document containing sensitive or encrypted content is opened by a document-management application having capability to directly access an Internet Protocol (IP) network, such as the Internet, without using the HyperText Transfer Protocol (HTTP). The application is selectively blocked from accessing the Internet whenever a protected document is opened by the application. The application may be, for example, the Microsoft® Word or the Adobe® Acrobat® Reader. The software tool restores the network access for the application once the protected document is no longer open in the application. Even though one application is blocked from accessing the IP network, the software tool allows another application to access the network so long as a non-protected document is opened by the other application. Thus, application-specific, selective blocking of network access is accomplished by the software tool based on document content.

20 Claims, 4 Drawing Sheets

(56) References Cited

U.S. PATENT DOCUMENTS

| | | | |
|---|---|---|---|
| 2011/0126293 A1* | 5/2011 | Berengoltz | G06F 21/62 |
| | | | 726/26 |
| 2012/0036370 A1* | 2/2012 | Lim | H04L 63/06 |
| | | | 713/189 |
| 2012/0222120 A1* | 8/2012 | Rim | G06F 21/566 |
| | | | 726/24 |
| 2013/0024944 A1* | 1/2013 | Sasaki | H04L 63/0227 |
| | | | 726/27 |
| 2018/0152296 A1* | 5/2018 | Parez | G06F 21/602 |

* cited by examiner

SELECTIVE BLOCKING OF NETWORK ACCESS FOR THIRD PARTY APPLICATIONS BASED ON FILE CONTENT

TECHNICAL FIELD

This disclosure relates generally to prevention of online data leaks and, more particularly, to an application-specific selective blocking of network access for a document-management application whenever a document containing protected/sensitive content is opened by the application and removing the network access block when the document is closed.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Modern information handling systems include many different types of consumer and commercial electronic devices such as, for example, personal computers (e.g., desktops or laptops), tablet computers, mobile devices (e.g., personal digital assistants (PDAs) or smart phones), corporate (or small business) server and data processing systems, and the like. In case of a corporate entity, these information handling systems may be connected not only to a corporate-specific intranet, but also to an external network, such as the Internet. Through the network connectivity, these information handling systems may exchange data (or other digital content) with each other and/or with an Internet-based cloud storage platform.

In today's data driven world, data is everywhere—on the corporate intranet and in the (external) cloud—and it is always within reach of users. Cloud services and cloud-based file storing are expanding in enterprise working environments. As a result, data breach has been one of the biggest fears that enterprise organizations face today. Data Leak Prevention (DLP) software may use business rules to classify and protect confidential and critical information so that unauthorized end users cannot accidentally or maliciously share data whose disclosure could put the organization or its stake-holders at risk. DLP in the modern enterprise environment is no longer merely a matter of blocking outside intruders from accessing a corporate intranet or any other internal network(s) of a company. In today's world, DLP requires both the location and classification of data as well as continuous data monitoring—whether the data is at rest, in motion, or in use.

SUMMARY

This Summary provides a simplified form of concepts that are further described below in the Detailed Description. This Summary is not intended to identify key or essential features and should therefore not be used for determining or limiting the scope of the claimed subject matter.

The present disclosure relates to a data leak prevention methodology in which a document-management application is selectively blocked from accessing an Internet Protocol (IP) network, such as the Internet, whenever a protected document containing sensitive or encrypted content is opened by the application. The document-management application may be, for example, the Microsoft® Word or the Adobe® Acrobat® Reader. In particular embodiments, this data leak prevention methodology may be implemented using a software tool. In particular embodiments, the software tool may restore the network access for the document-management application once the protected document is no longer open in the application. Furthermore, in some embodiments, even though one document-management application is blocked from accessing the IP network, the software tool may permit another document-management application to access the IP network so long as a non-protected document is opened by the other application. Thus, application-specific, selective blocking of network access may be accomplished by the software tool based on the file content.

In one embodiment, the present disclosure is directed to a method, which comprises: (i) receiving, by a computing system, one or more application-specific identifiers generated in response to execution of a document-management application by the computing system; (ii) based on the one or more application-specific identifiers, determining, by the computing system, that the document-management application is permitted to open a protected document including encrypted content; (iii) opening, by the computing system, the protected document in the first document-management application; (iv) decrypting, by the computing system, the encrypted content included in the protected document; and (v) substantially concurrently with decrypting the content, inserting, by the computing system, an application-specific blocking policy into a network engine to enable the network engine to block the document-management application from accessing a network. In particular embodiments, the network may be an Internet Protocol (IP) network, such as the Internet.

In another embodiment, the present disclosure is directed to a computing system, which comprises: a memory storing program instructions; and a processing unit coupled to the memory and operable to execute the program instructions. In the computing system, the program instructions, when executed by the processing unit, cause the computing system to: (i) receive one or more application-specific identifiers generated in response to execution of a document-management application by the computing system; (ii) based on the one or more application-specific identifiers, determine that the document-management application is permitted to open a protected document including encrypted content; (iii) open the protected document in the document-management application; (iv) decrypt the encrypted content included in the protected document; and (v) substantially concurrently with decrypting the content, insert an application-specific blocking policy into a network engine to enable the network engine to block the document-management application from accessing an IP network.

In a further embodiment, the present disclosure is directed to a computer program product comprising a non-transitory computer-usable medium having computer-readable program code embodied therein, wherein the computer-readable program code is adapted to be executed by a computing system to implement a method. The method comprises: (a) receiving one or more application-specific identifiers generated in response to execution of a document-management application by the computing system; (b) based on the one or more application-specific identifiers, determining that the document-management application is permitted to open a protected document including encrypted content; (c) opening the protected document in the document-management application; (d) decrypting the encrypted content included in the protected document; and (d) substantially concurrently with decrypting the content, inserting an application-specific blocking policy into a network engine to enable the network engine to block the document-management application from accessing a network. As noted before, in particular embodiments, the network may be an IP network, such as the Internet With ever-increasing usage of online or cloud-based storage of content, the network access-blocking software tool as per teachings of the present disclosure may provide dynamic data leak protection when a third party document-management application attempts to access the Internet when a protected/sensitive document is opened by the application. This file content-based, application-specific selective blocking allows the software tool to prevent unencrypted sensitive data from being directly shared to an external/third party cloud storage. As a result of this robust data protection mechanism, an organization's sensitive content may be protected from accidental or malicious sharing online. A DLP product incorporating such access-blocking tool may consequently provide a more secure data protection to enterprise users.

BRIEF DESCRIPTION OF THE DRAWINGS

A more complete understanding of the present disclosure may be obtained by reference to the following Detailed Description when taken in conjunction with the accompanying Drawings. For ease of discussion, the same reference numbers in different figures indicate similar or identical items.

DETAILED DESCRIPTION

For purpose of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, read-only memory (ROM), and/or other types of nonvolatile memory. Additional components of the information handling system may include one or more disk drives, one or more network ports for communicating with external devices as well as various input and output (I/O) devices, such as a keyboard, a mouse, touch-screen and/or video display. The information handling system may also include one or more buses operable to transmit communications between the various hardware components.

It is noted here that, for ease of discussion, a computer software, program code or module may be referred to as "performing," "accomplishing," or "carrying out" a function or process. However, it is evident to one skilled in the art that such performance may be technically accomplished by a processor when the software or program code is executed by the processor. The program execution would cause the processor to perform the tasks or steps instructed by the software to accomplish the desired functionality or result. However, for the sake of convenience, in the discussion below, a processor or software component may be referred to interchangeably as an "actor" performing the task or action described, without technically dissecting the underlying software execution mechanism. Furthermore, a hyphenated term (e.g., "application-specific", "computer-readable", etc.) may be occasionally interchangeably used with its non-hyphenated version (e.g., "application specific," "computer readable", etc.), and a capitalized entry (e.g., "Operating System", "Host Computer", etc.) may be interchangeably used with its non-capitalized version (e.g., "operating system," "host computer", etc.). Such occasional interchangeable uses shall not be considered inconsistent with each other.

As mentioned before, it is becoming increasingly common for corporate entities to use cloud services and cloud file sharing to store and exchange their data. Typically, a cloud-based data storage is offered by a third party software solution provider. The corporate entity simply may be a client of the solution provider and, hence, the cloud storage may not be under the control of the corporate entity. Furthermore, the remote, Internet-based storage of data/content in a cloud environment may expose the data to malicious online hacks or targeted attacks by unauthorized users. Additionally, certain third party document-management applications, like the earlier mentioned Microsoft® Word or Adobe® Acrobat® Reader programs, make remotely-stored data more vulnerable to sensitive data leaks—whether accidental or malicious—because these applications allow instant sharing of any data and sensitive content to a cloud storage through the Internet or other network. Without proper measures, a company's most valuable data can end up in the wrong hands. Once an encrypted file is unencrypted and opened by such a document-management application, the application allows transmission and online storage of the unencrypted sensitive data in the file. Thus, even if the document is a protected/encrypted document, the document-management application would allow its sensitive content to be sent to a remote storage online. Even when a user accidentally authorizes the application to share the sensitive data with the online storage, there is no mechanism to prevent the application from sending the protected content online. Once the sensitive data is online, it may be difficult to trace and detect data leakage.

Currently, most solutions for DLP software to address cloud data security vulnerabilities primarily take one of the following two forms:

(i) Protection for Personal Cloud File Sync and Share: This solution monitors and prevents users from syncing sensitive work files from their desktops to their personal cloud storage such as, for example, Box, Dropbox®, Google® Drive, Hightail®, iCloud, and Microsoft® OneDrive®. A major shortcoming of this solution is that third party document-management applications, like Microsoft® Office suite of programs or Adobe® Acrobat® Reader, do not rely on the HyperText Transfer Protocol (HTTP) as their main, out-of-the-box communications protocol to communicate over the Internet. Instead of using a sync client (which can be controlled by the DLP software) to migrate data over the Internet, these document-management applications let user decide when and if the data can be pushed to cloud storage. As a result, this solution fails to prevent these applications from instantly sharing any data and sensitive content to cloud storage.

(ii) Setting up Firewalls and Creating Enterprise Confidentiality Policies: This solution uses firewalls and enterprise confidentiality policy to prevent sensitive data from migrating to third party cloud storage. Because document-management applications, like Microsoft® Office suite of programs or Adobe® Acrobat® Reader, can be controlled by enterprise confidentiality policy, they can be blocked from sharing protected/sensitive content to cloud storage. However, because network access is brutally blocked by a firewall, these third party document-management applications are not able to access the Internet even if the document is not a protected/sensitive document. Therefore, functionalities of these applications are constrained and user experiences suffer.

The system and techniques described herein implement a software tool that applies DLP control to the above-mentioned third party document-management applications based on whether a protected/sensitive document is currently opened and selectively block the network access for the application so long as the protected document is open. The techniques of the present disclosure also permit the document-management application with an opened protected/sensitive document to seamlessly use its various functionalities, yet still prevent the application from directly sharing the unencrypted sensitive data to an online cloud storage or other Internet-based entity. This application-specific, selective blocking of network access based on the file content may protect an enterprise's confidential and critical information from inadvertent or malicious disclosure.

It is noted that, in the discussion herein, the terms "software tool", "selective network access-blocking tool", and "network access blocking tool" may be used interchangeably. Similarly, the terms "application" and "document-management application" also may be used interchangeably for ease of discussion, as may be evident from the context.

Figure 1:
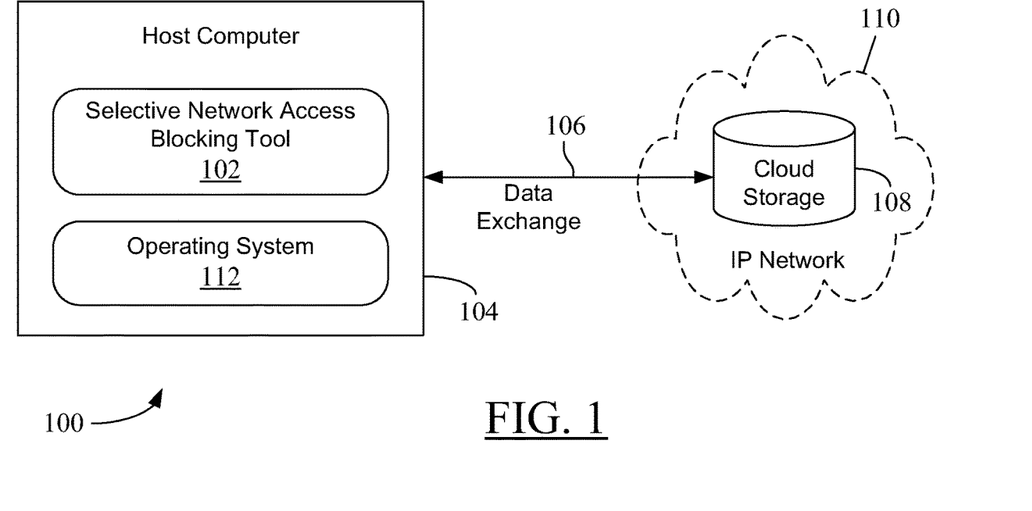
FIG. 1 shows an exemplary arrangement to implement selective network access-blocking using a software tool as per particular embodiments of the present disclosure.

FIG. 1 shows an exemplary arrangement 100 to implement selective network access-blocking using a software tool 102 as per particular embodiments of the present disclosure. The software tool 102 (referred to as a "selective network access blocking tool" in FIG. 1) may be a stand-alone software module or a part of a DLP software product. The software tool 102 may comprise program code, which, upon execution by a processor (not shown) in a host computer 104, may perform selective blocking of network access for a third party document-management application, as described in more detail later below. In certain embodiments, the host computer 104 may be associated with a corporate user, and the network access-blocking tool 102 may be deployed by the relevant corporate entity to prevent data leaks through document-management application(s) executed by the user operating the host computer 104. In FIG. 1, a bi-directional arrow with reference numeral "106" is used to illustrate that the host computer 104 may be communicatively coupled with a cloud storage system/ platform 108 to send/retrieve data to/from the cloud storage 108. It is understood that the cloud-based remote data storage arrangement illustrated in FIG. 1 is merely an example. In some embodiments, the data exchange at arrow 106 may be with an online entity or service—such as, for example, an online chatting platform or an online e-mail account—that may not be a commercial provider of cloud storage or that may not be typically viewed as a "cloud storage."

Figure 6:
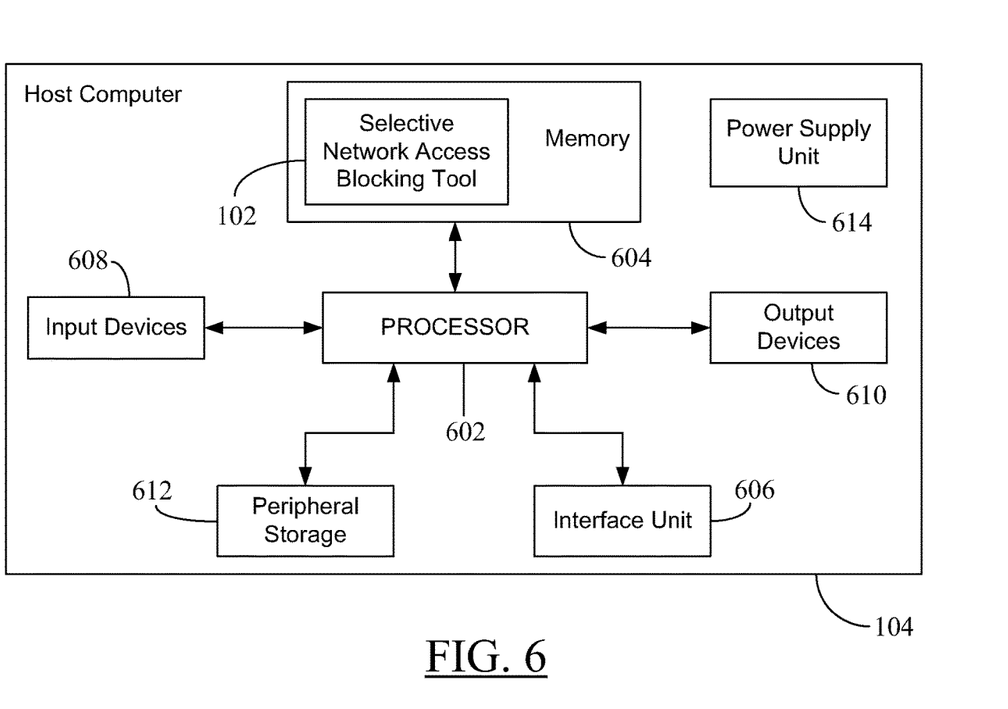
FIG. 6 illustrates an example configuration of a computer system that can be used to implement the software tool described herein.

In particular embodiments, the host computer 104 may be an information handling system (discussed earlier) and the program code constituting the software tool 102 may be stored in a storage unit or memory (not shown) in the host computer 104. Such memory, processor, and other exemplary architectural details of the host computer 104 are shown in FIG. 6 and discussed later below. As noted before, the host computer 104 may be associated with a commercial enterprise or corporate entity. The architectural configuration of the cloud storage 108 or associated website (or web server) is not relevant to the present disclosure and, hence, no additional details thereof are provided here.

As illustrated in FIG. 1, the host computer 104 and the remote cloud storage 108 may communicate with each other via a communication network 110 such as, for example, an Internet Protocol (IP) network. In a typical implementation, the IP network 110 may be the Internet. However, in other embodiments, the host computer 104 and the remote storage 108 may communicate via different types of communication networks that support HTTP or other similar protocol-based bi-directional communication. In one embodiment, the program code for the software tool 102 may be downloaded into and stored in a memory (not shown) in the host computer 104 via a corporate intranet (not shown). The stored program code may be executed by a processor (not shown) in the host computer 104 under operative control of an Operating System (OS) 112 of the host computer 104. In one embodiment, the software tool 102 may be a Microsoft® Windows® tool. Although the discussion herein primarily focuses on a Microsoft® Windows® based operating system (such as, for example, Windows XP, Windows 7, 8, or 10, and Windows NT operating systems), a software tool as per the teachings of the present disclosure may be implemented in a computer system having a different operating system.

The document-management application (not shown) as well as the software tool 102 may be executing on the host computer 104 that is connected to the IP network 110. Some exemplary document-management applications include a HyperText Markup Language (HTML) document creation application, the Adobe® Acrobat® Reader, and various data processing applications—such as, for example, Microsoft® Word, Microsoft Excel®, and Microsoft Powerpoint®—contained in the Microsoft® Office suite of programs. It is known that the Adobe® Reader is a Portable Document Format (PDF) file management application, the Microsoft® Word is a word-processing application, the Microsoft Excel® is a spreadsheet-generating/managing application, and the Microsoft Powerpoint® is a slide-based presentation application. Thus, the term "document" in the phrase "document-management application" may encompass files or content that is not strictly a text "document." More generally, a document-management application relevant to the present disclosure may be an application having capability to directly access the cloud/Internet such as, for example, an application having capability to access the IP network 110 without using the HTTP protocol.

Figure 2:
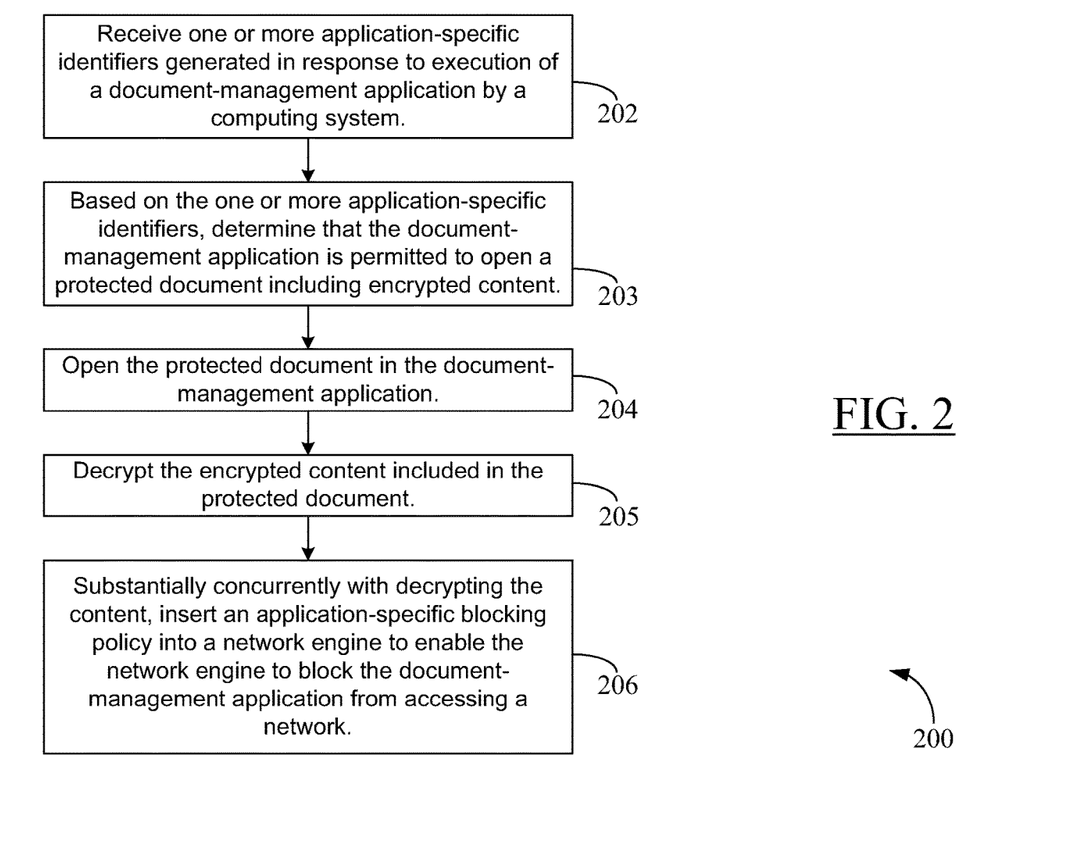
FIG. 2 is an exemplary flowchart depicting various steps that may be performed by a computing system as per particular embodiments of the present disclosure to carry out selective blocking of network access for a document-management application.
Figure 3:
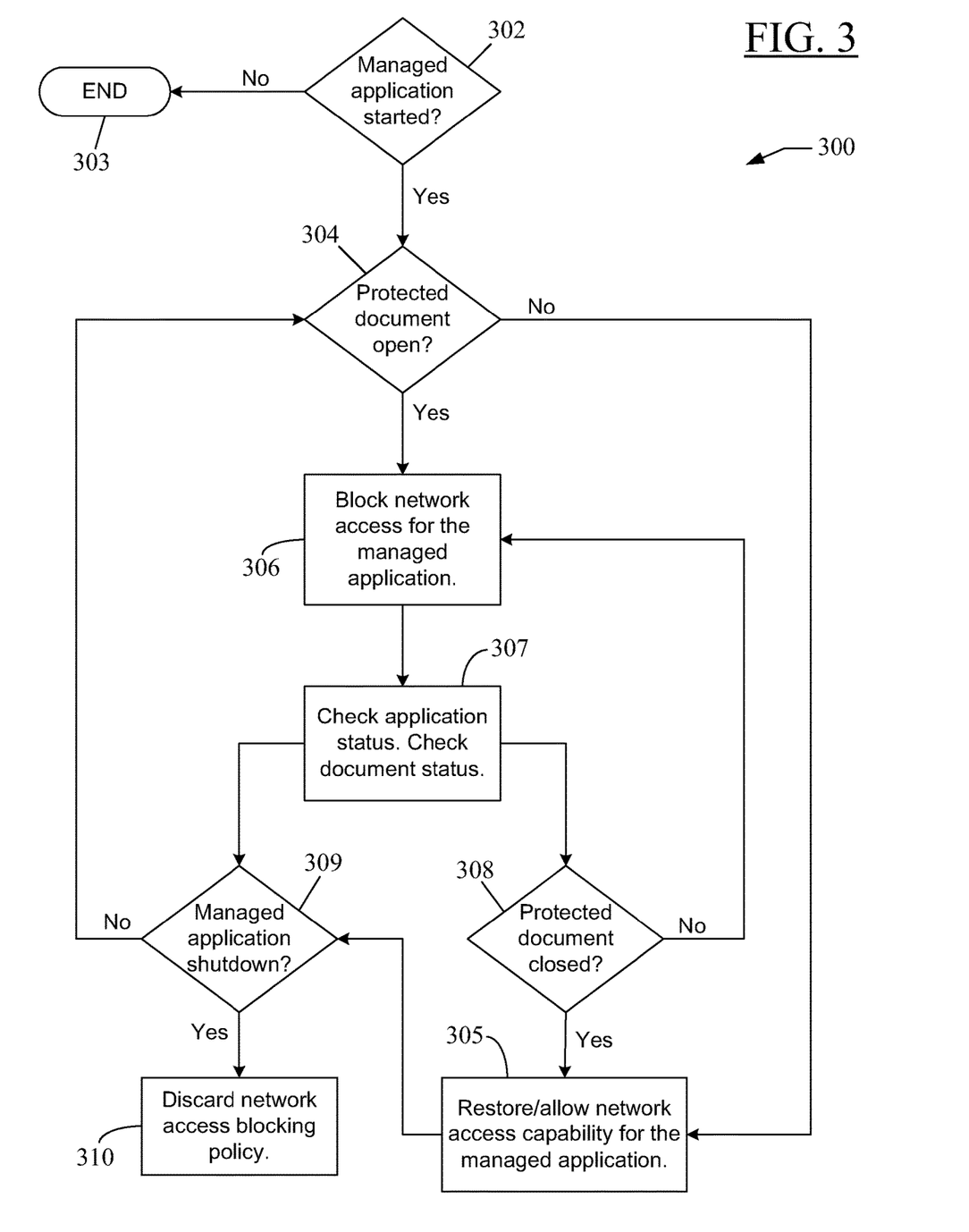
FIG. 3 is another exemplary flowchart depicting additional details of selective network access-blocking as per particular embodiments of the present disclosure.

Upon execution of the program code for the software tool 102 by a processor (not shown) in the host computer 104, the host computer 104 may perform different operations to carry out application-specific selective blocking of network access as per teachings of the present disclosure. Two exemplary sets of such operations are illustrated in FIGS. 2-3, which are discussed later below. In one embodiment, the software tool 102 may interact with various components of the OS 112 to configure the host computer 104 to carry out the selective network access-blocking, as discussed in more detail later with reference to FIG. 5.

FIG. 2 is an exemplary flowchart 200 depicting various steps that may be performed by a computing system as per particular embodiments of the present disclosure to carry out selective blocking of network access for a document-management application. In one embodiment, the computing system may be the host computer 104 shown in FIG. 1 and the document-management application may be any of the earlier-mentioned applications or other such applications having similar functionality. More generally, the host computer 104 performing the steps shown in FIG. 2 may include in hardware and/or software the functionality of the network access blocking tool 102 and, hence, the host computer 104 may be considered a computing system capable of implementing the application-specific, selective network access blocking functionality as per teachings of the present disclosure. In one embodiment, the program code for the software tool 102 (and other relevant program code such as the program code for the OS 112) may be executed by a processor (not shown) in the host computer 104 and, upon execution of the program code, the host computer 104 may be operative to perform the tasks illustrated in FIG. 2.

Initially, upon download and installation of the software tool 102, the computing system—here, the host computer 104—may continually monitor the execution status of a document-management application. As noted at text block 202, the computing system may receive one or more application-specific identifiers generated in response to execution of the document-management application by the computing system 104. As discussed later below, the application-specific identifiers include the process identifier (ID) (PID) and the process name associated with the executed application. Based on the received one or more identifiers, the computing system may determine that the document-management application is permitted to open a protected document including encrypted content (text block 203). Thereafter, the computing system may open the protected document in the document-management application (text block 204). The computing system also may decrypt the encrypted content included in the protected document, as noted at text block 205. Substantially concurrently with decrypting the content, the computing system may insert an application-specific blocking policy into a network engine to enable the network engine to block the document-management application from accessing a network, as specified at text block 206. In particular embodiments, the network may be an IP network, such as the Internet. In this manner, in some embodiments, the computing system 104 may perform application-specific, selective blocking of network access based on the content of the file opened by the application.

FIG. 3 is another exemplary flowchart 300 depicting additional details of selective network access-blocking as per particular embodiments of the present disclosure. The flowchart 300 in FIG. 3 may be considered to supplement certain details missing from the flowchart 200 in FIG. 2. As in case of the flowchart 200 in FIG. 2, upon execution of the program code for the software tool 102 (and other relevant program code such as the program code for the OS 112) by a processor (not shown) in the host computer 104, the host computer 104 may be operative to perform the tasks illustrated in FIG. 3.

Initially, the host computer 104 may determine, at decision block 302, whether a managed application is started or being executed therein. The application-specific identifiers such as the PID and the process name associated with the executed application may indicate that the application is a "managed application"—that is, the application is one of a number of document-management applications for which network access blocking as per teachings of the present disclosure may be needed. If the application is not a managed application, the selective network access blocking as per teachings of the present disclosure may not be necessary and, hence, the process may end at text block 303. For the managed application, a determination may be made at decision block 304 whether a protected document—for example, a document having encrypted sensitive content—is opened by the application or not. As mentioned before, a corporate user may actually open such a document using the corresponding document-management application executing on the host computer 104. If the protected document is not open, the host computer 104 may continue to allow network access capability for the managed application, as noted at text block 305. However, if the protected document is indeed open, the host computer 104 may decrypt the document's encrypted content so that the user can view the content, but block the network access for the managed application (text block 306) in the manner discussed later with reference to the embodiment of FIG. 5. As a result, the managed application may not be able to access an IP network, such as the Internet, to transmit unencrypted sensitive content online.

The host computer 104 may continually check the status of the managed application as well as that of the opened document (text block 307) to determine whether the network access is to be restored for the managed application. Thus, if the host computer 104 determines that the protected document is no longer open (decision block 308) (for example, when the user closes the document), the host computer 104 may restore the network access capability for the managed application (text block 305) until a protected document is again opened by the managed application (decision blocks 309, 304). On the other hand, if the managed application is shutdown (that is, no longer executing), the host computer may discard the network access-blocking policy (text block 310) earlier instituted for the managed application at text block 306. A new network access-blocking policy may be implemented when the managed application is executed again with a protected document open. In this manner, selective blocking of network access may be accomplished for third party document-management applications based on file content.

Figure 4:
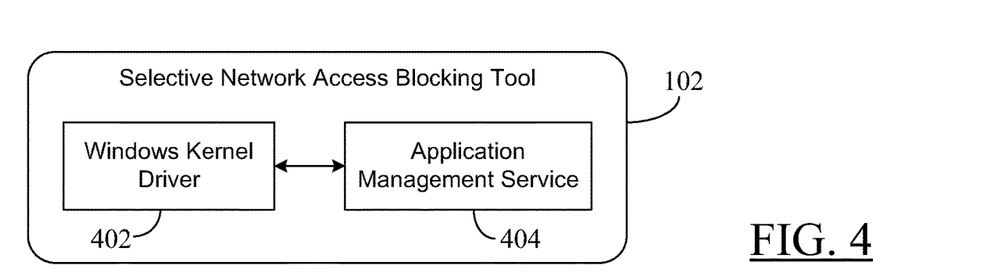
FIG. 4 shows exemplary software modules that may comprise the software tool as per certain embodiments of the present disclosure.

FIG. 4 shows exemplary software modules that may comprise the software tool 102 as per certain embodiments of the present disclosure. In the exemplary case of a Microsoft® Windows® based operating system 112, the software modules may include a Windows® kernel driver 402 and a Windows® based application management service (AMS) 404. Upon execution by a processor (not shown) in the host computer 104, the program code of each software module 402, 404 may interact with each other and with other components/processes of the OS 112 to enable the host computer 104 to accomplish the selective network access-blocking as per particular embodiments of the present disclosure. In one embodiment, the AMS 404 may be a privileged background process that handles communications of policy information, processes application activities of a document-management application as reported by the kernel driver 402, and notifies the kernel driver 402 about the status of a currently-opened document—that is, whether the document is a protected sensitive document or not. At run time, the kernel driver 402, may be inserted into an OS's Transmission Control Protocol/Internet Protocol (TCP/IP) stack for network communication to selectively control network traffic flow based on the application's execution status and the document's protected status. In one embodiment, the kernel driver 402 also may monitor the activities of a document-management application so that the AMS 404 can apply appropriate policy information—such as, for example, network access to be blocked or not—on an opened document.

More specifically, in particular embodiments, the kernel driver 402 may monitor and report activities of different applications—for example, document-management applications and other types of applications—being executed within the host computer 104. When an application starts to run, the kernel driver 402 may send an event notification to the AMS 404 and report a new process ID (PID) and process name associated with the application to the AMS 404 as part of the notification. Based on the event reported by the kernel driver 402, the AMS 404 may manage which applications are permitted to open encrypted documents, seamlessly decrypt files for them, and provide the application-specific security policy to the kernel driver 402. From the security policy pushed down by the AMS 404, the kernel driver 402 is able to recognize which managed application has a protected/sensitive document opened currently. Accordingly, the kernel driver 402 will insert an application-specific network-blocking policy into a TCP/IP network engine so that only those managed applications can't access the IP network 110 (FIG. 1) to share any data and sensitive content to the cloud storage 108 through the network 110.

Figure 5:
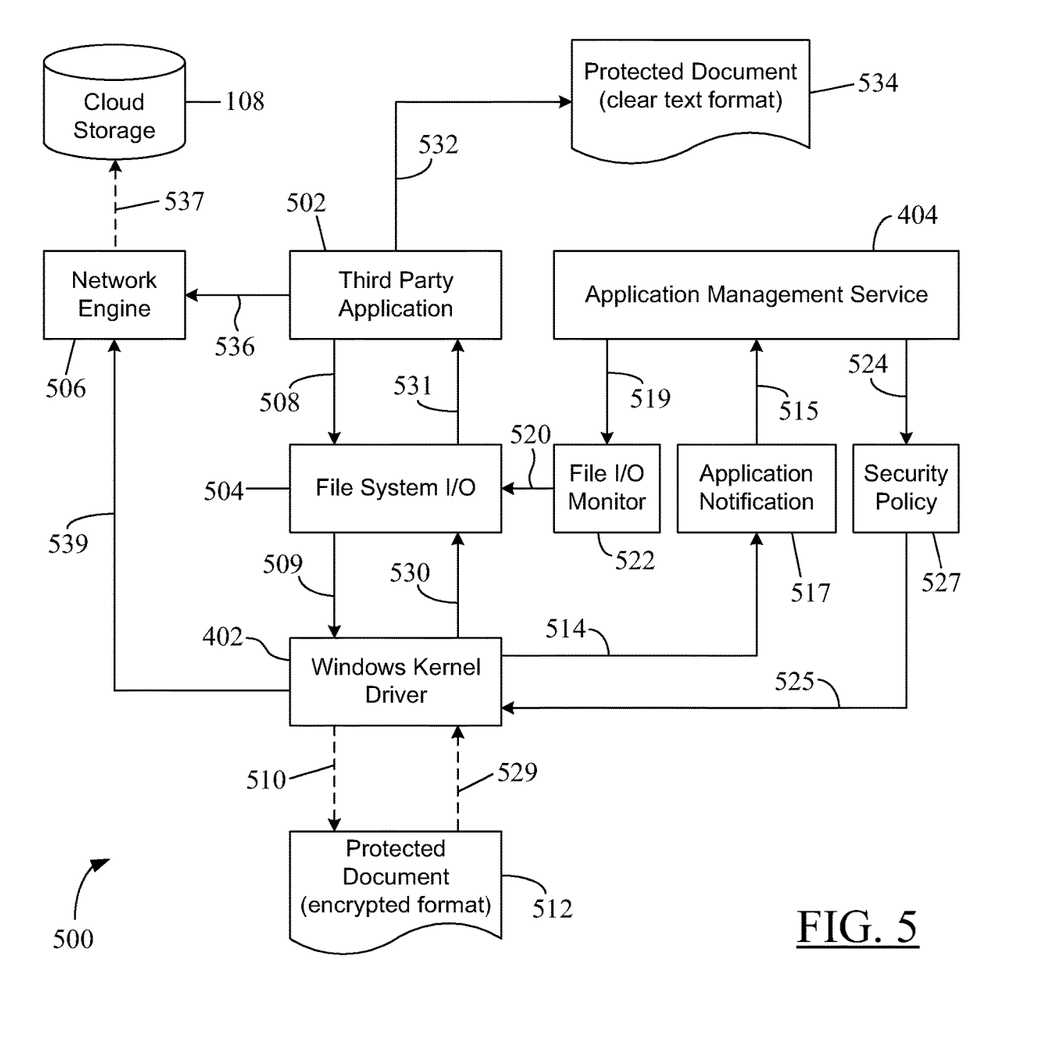
FIG. 5 depicts an exemplary block diagram showing how the software tool as per particular embodiments of the present disclosure may interact with other system elements to accomplish selective blocking of network access for a document-management application.

FIG. 5 depicts an exemplary block diagram 500 showing how the software tool 102 as per particular embodiments of the present disclosure may interact with other system elements to accomplish selective blocking of network access for a document-management application. A text block with reference numeral "502" is used in FIG. 5 to symbolically illustrate a document-management application, some examples of which are already given before. In FIG. 5, the software modules 402 and 404 of the software tool 102 are shown separately to illustrate their individual functionalities in more detail. These software modules 402, 404 are shown to interact with a file system Input/Output (I/O) 504 and a network engine 506 in the host computer 104. The file system I/O 504 may manage I/O operations—such as for example, create, open, close, read, write, move, rename, delete, and the like—on various data files in the host computer 104. These data files may be stored in a data storage—such as, for example, the peripheral storage 612 (FIG. 6)—in the host computer 104. The network engine 506 may be implemented in hardware, software, or a combination of both, and may facilitate data communication between the host computer 104 and a network-connected remote entity such as, for example, the cloud storage 108 in FIG. 1. In one embodiment, the network engine 506 may be a TCP/IP based network engine facilitating host computer's 104 communication with an IP network (for example, the Internet). In other embodiments, the network engine 506 may facilitate communication with other types of data networks as well, including, for example, a corporate intranet. In some embodiments, the components 504 and 506 may be part of the OS 112.

At startup, the kernel driver 402 may monitor the file system I/O 504 for activities of all applications, including document-management applications and others. In the context of the embodiment in FIG. 5, when the document-management application 502 starts/executes, the kernel driver 402 may receive that information as symbolically illustrated using arrows 508-509. As illustrated by dotted arrow 510, the document-management application 502 also may attempt to open a protected document 512 stored in an encrypted format. The kernel driver 402 may fire an application-starting event to the AMS 404 and report the process name and process ID (PID) for the application 502 to the AMS 404. These event notification and reporting activities are symbolically illustrated by arrows 514-515 and the text block 517 in FIG. 5. In particular embodiments, the kernel driver 402 may receive the application-specific process name and PID for the application 502 from the file system I/O 504.

As indicated by arrow 515, the AMS 404 may receive notification from the kernel driver 402 about starting/execution of the application 502. In particular embodiments, the AMS 404 may use PID and process name reported by the driver 402 to decide if the application 502 is one of the managed applications. As mentioned before, a "managed application" may be a document-management application for which network access blocking as per teachings of the present disclosure may be needed. For each managed application that is being executed in the host computer 104, the AMS 404 may continually monitor the file system I/O 504 to identify if a protected/sensitive document 512 is being opened by the corresponding managed application. This monitoring task is symbolically illustrated by arrows 519-520 and the text block 522 in FIG. 5. If the managed application is allowed to open an encrypted document, the AMS 404 may seamlessly decrypt the document file for the application, permitting the application to open the protected/encrypted document. Substantially concurrently with decrypting the protected document, the AMS 404 also may push the application-specific document policy for the currently-opened document to the kernel driver 402 with relevant information such as, for example, whether the respective managed application has an encrypted document active or not. This security policy-sharing is symbolically illustrated by arrows 524-525 and the text block 527 in FIG. 5. In case of the application 502 in the embodiment of FIG. 5, the AMS 404 would inform the kernel driver 402 that the encrypted document 512 is active/opened and that the security policy for the application 502 and the document 512 would require a network access block for the application 502. Furthermore, in the embodiment of FIG. 5, the managed application 502 may be permitted to open a decrypted/ unencrypted version of the protected document 512, and the decrypted version may contain the sensitive content in a clear text format, as illustrated by the arrows 529-532 and the text block 534.

As mentioned before, once an encrypted file is unencrypted and opened by a third party document-management application, like Microsoft® Office suite of programs or Adobe® Acrobat® Reader, the application would allow transmission and online storage of the unencrypted sensitive data in the file. Thus, even if the document is a protected/ encrypted document, the document-management application would allow its sensitive content to be sent to a remote storage online. Furthermore, these applications do not rely on the HTTP protocol as their main, out-of-the-box communications protocol to communicate over the Internet. Therefore, without additional instructions or configuration, the network engine 506 may not be able to prevent the application 502 from accessing the Internet and communicating with the cloud storage 108. Hence, selective network access-blocking may be desirable to prevent network access by the application 502 so long as the protected document 512 is open. As discussed below, once the protected document is closed or no longer active/open, the restriction on the network access may be removed. In FIG. 5, the arrows 510, 529 are shown dotted to indicate the optional nature of opening a protected document. The third party application 502 may not necessarily open only protected documents; it may open non-protected documents as well, in which case, the application's network access may not be blocked. Thus, when the application 502 opens a non-protected document (containing unencrypted/non-sensitive content), the application 502 may be permitted to access the Internet and exchange data with the cloud storage 108, as indicated by arrows 536-537 in FIG. 5. The dotted arrow 537 indicates that the data storage in the cloud (or elsewhere online) may be optional in some embodiments. Regardless of whether the data are stored online or not, the present disclosure is relevant to restrict the third party document-management application 502 from accessing the Internet whenever the application 502 opens a protected document.

In the embodiment of FIG. 5, the kernel driver 402 receives the security policy 527 from the AMS 404, as indicated by the arrow 525. In response, the kernel driver 402 may perform selective network access-blocking depending on the file content. Thus, based on the execution status of the managed application 502 and the protected/ sensitive status of the opened document 512, the driver 402 may insert a network-blocking policy (for the application 502) into the TCP/IP network engine 506, as symbolically illustrated by the arrow 539. The application-specific, network-blocking policy may enable the network engine 506 to block the corresponding third party application 502 from accessing the IP network 110 (FIG. 1). Thus, unencrypted sensitive content of the protected document 512 may not be transmitted online by the third party application 502 even if the application does not rely on the HTTP protocol to communicate over the Internet. This access-blocking is selective because it is applied only when the application 502 is executing and has opened a protected document, such as the document 512. The AMS 404 and the kernel driver 402 may continue to monitor the document status as well as the application status. Thus, in one embodiment, if the protected/sensitive document 512 is closed (for example, by the user of the application 502), the AMS 404 may send an updated (new) document security policy 527 to the driver 402 so that the driver 402 can release network access. On the other hand, if the managed application 502 is closed/shut down, the driver 402 may send a notification 517 to the AMS 404 to update the application's status.

In some embodiments, an alert message may be displayed on a display screen (not shown) of the host computer 104 (FIG. 1) informing the user of the host computer 104 that network access is blocked for the managed application 502 because a protected file—like the document 512—is open. The alert message may be generated by the software tool 102 (FIG. 1) or some other system software (or OS component) interacting with the software tool 102.

If the driver 402 receives a new updated policy 527 from the AMS 404 and if the protected/sensitive document 512 is closed (no longer open), the driver 402 may remove the earlier-placed network access block from the TCP/IP network engine 506 and restore network access capability for the managed application 502. As part of restoring network access, the driver 402 may de-activate the application-specific blocking policy in the network engine 506 so as to restore network access capability for the application 502. In one embodiment, the driver 402 may generate an application-specific updated access policy, provide this updated access policy to the network engine 506, and instruct the network engine 506 to replace the earlier network blocking policy with the updated access policy to allow the application 502 to access the IP network 110.

As noted before, the driver 402 may monitor the execution status of the document-management application 502. When the application 502 is no longer active, the driver 402 may receive an indication from the file system I/O 504 that the execution of the application 502 is terminated. As a result, in one embodiment, the driver 402 may instruct the network engine 506 to discard the earlier-provided application-specific network-blocking policy. When the application 502 executes again and opens a protected document, a new network blocking policy may be inserted into the network engine 506 at that time.

It is observed that if the document-management application 502 opens a document that is not protected or that does not contain sensitive information, the kernel driver 402 may not need to place any network block at the network engine 506. In that case, the application 502 may continue to access the IP network 110 in a routine manner. However, in some embodiments, if the non-protected document is opened while a protected document is also open by the same document-management application, the network access for the application may continue to be blocked to prevent any accidental transmission of sensitive/confidential content online. In certain embodiments, if another managed application (not shown) is also executed in the host computer 104 while the protected document 512 is still open in the current application 502, the process steps discussed with reference to FIGS. 2-3 and FIG. 5 may be carried out for this newly-started application as well. If the new document-management application opens a non-protected document containing unencrypted content, the kernel driver 402 may not place any network block at the network engine 506 for this new application, thereby enabling the new application to access the IP network 110 even if the earlier application 502 is blocked from accessing the IP network 110 because of its opening of the protected document 512. In this manner, application-specific selective blocking of network access may be implemented in particular embodiments.

The process and tasks discussed with reference to FIGS. 2-5 ensure that the sensitive content or protected information is not shared online through a document-management application executing on the host computer 104. As a result, documents or files with encrypted/critical information may be opened securely using the host computer 104. The network access-blocking approach discussed herein can simultaneously and dynamically control network access of multiple document-management applications based on the content (protected or not) of the data file(s) opened by the respective application.

FIG. 6 illustrates an example configuration of a computer system, such as the host computer 104, that can be used to implement the software tool 102 described herein. The computer system (or computing device) 104 may be suitably configured to implement the functionality of the network access-blocking tool 102 according to the teachings of the present disclosure. The computer system 104 may include one or more processors 602, a memory unit 604, an interface unit 606 providing communication interfaces, one or more input devices 608, one or more output devices 610, and a peripheral storage unit 612, connected to the processor 602 as shown and configured to communicate with each other, such as via one or more system buses (not shown) or other suitable connection.

In one embodiment, the input devices 608 may provide user inputs—such as, for example, user inputs to open and work on a protected document—to the processor 602 and the software tool 102 for further processing. The input devices 608 may include, for example, a touchpad, a camera, a computer keyboard, a touch-screen, a joystick, a physical or virtual "clickable button," a computer mouse/pointing device, and the like. A display screen is an example of the output device 610. Other examples of an output device include a graphics/display device, a computer screen or monitor, an alarm system, or any other type of data output device. In some embodiments, the input device(s) 608 and the output device(s) 610 may be coupled to the processor 602 via an I/O or peripheral interface(s). In some embodiments, the computer system 104 may include more than one instance of the devices shown. In various embodiments, all of the components shown in FIG. 6 may be housed within a single housing. In other embodiments, the computer system 104 may not include all of the components shown in FIG. 6. Furthermore, the computing device 104 may be configured as a standalone system, as a server system, as a client system, or in any other suitable form factor.

The processor 602 is a hardware device that may include a single processing unit or a number of processing units, all of which may include single or multiple computing units or multiple cores. When the computing device 104 is a multi-processor system, there may be more than one instance of the processor 602 or there may be multiple processors coupled to the processor 602 via their respective interfaces (not shown). The processor 602 may include an integrated Graphics Processing Unit (GPU) or the GPU may be a separate processor device in the system 104. The processor 602 may be implemented as one or more microprocessors, microcomputers, microcontrollers, Digital Signal Processors (DSPs), Central Processing Units (CPUs), Graphics Processing Units (GPUs), state machines, logic circuitries, and/or any devices that manipulate signals based on operational instructions. Among other capabilities, the processor 602 may be configured to fetch and execute computer-readable instructions stored in the memory 604, the peripheral storage 612, or other computer-readable media. In some embodiments, the processor 602 may be a System on Chip (SoC).

The memory 604 and the peripheral storage unit 612 are examples of non-transitory computer media (e.g., memory storage devices) for storing instructions that can be executed by the processor 602 to perform the various functions described herein. For example, the memory unit 604 may include both volatile memory and non-volatile memory (e.g., RAM, ROM, or the like) devices. Further, in particular embodiments, the peripheral storage unit 612 may include one or more mass storage devices such as, for example, hard disk drives, solid-state drives, removable media, including external and removable drives, memory cards, flash memory, floppy disks, optical disks (e.g., CD, DVD), a storage array, a network attached storage, a storage area network, or the like. Both memory 604 and mass storage devices constituting the peripheral storage 612 may be collectively referred to as memory or computer storage media herein, and may be a media capable of storing computer-readable, processor-executable program instructions as computer program code that can be executed by the processor 602 as a particular machine configured for carrying out the operations and functions described in the implementations herein.

The computing device 104 also may include one or more communication interfaces as part of its interface unit 606 for exchanging data via a network. The communication interfaces can facilitate communications within a wide variety of networks and protocol types, including wired networks (e.g., Ethernet, Digital Subscriber Loop (DSL), Data Over Cable Service Interface Specification (DOCSIS), Fiber Optics network, Universal Serial Bus (USB), etc.) and wireless networks (e.g., Wireless Local Area Network (WLAN), Global System for Mobile Communications (GSM), Code Division Multiple Access (CDMA), Institute of Electrical and Electronics Engineers (IEEE) standard 802.11, Bluetooth®, Wireless USB, cellular, satellite, etc.), a corporate intranet, the Internet (or, more generally, the IP network 110), and the like. Communication interfaces in the interface unit 606 can also provide communication with external storage (not shown), such as in a storage array, network attached storage, storage area network, one or more databases, or the like. In one embodiment, some or all functionalities of the network engine 506 (FIG. 5) may be implemented through the interface unit 606.

The computer storage media, such as the memory 604 and the mass storage devices in the peripheral storage 612, may be used to store software and data. For example, the computer storage media may be used to store the operating system (OS) 112 for the computing device 104, various device drivers—such as the kernel driver 402—for the device 104, various inputs provided by the user (for example, the user inputs related to executing a document-management application, opening a document, identifying a document's content as sensitive content, and the like), information received over a corporate intranet or through other means (for example, business rules to classify and protect certain data or documentary content), and the data such as audio content, video content, text data, streaming content, or any other type of content. The computer storage media also may store software applications such as a word processing application, a spreadsheet application, the software tool 102, and the like. The program code for the software applications and the OS 112 may be executed by the processor 602.

In one embodiment, a non-transitory, computer-readable data storage medium, such as, for example, the system memory 604 or the peripheral data storage unit 612 may store the program code or software for the software tool 102. In the embodiment of FIG. 6, the system memory 604 is shown to include such program code. In the embodiment of FIG. 6, the software tool 102 may operate in conjunction with the host OS 112 (FIG. 1). The processor 602 may be configured to execute the program code for the software tool 102, whereby the computer system (or computing device) 104 may be operative to perform various network access-blocking tasks associated with the software tool 102 as per the teachings of the present disclosure. In one embodiment, such tasks may include, for example, the process steps illustrated in FIGS. 2-3 as well as other tasks discussed with reference to FIGS. 4-5 such as, for example, determination of whether a document-management application is started and whether a protected document is opened by the application, insertion of an application-specific network blocking policy into a TCP/IP network engine, removal of the network block when the protected document is closed, and so on. The program code or software for the software tool 102 may be proprietary software or open source software which, upon execution by the processor 602, may enable the computer system 104 to perform operations to support the file content-based selective blocking of network access for document-management applications as per teachings of the present disclosure.

In particular embodiments, the computing device 104 may include an on-board power supply unit 614 to provide electrical power to various system components illustrated in FIG. 6. The power supply unit 614 may receive batteries or may be connectable to an AC electrical power outlet. In one embodiment, the power supply unit 614 may convert solar energy or other renewable energy into electrical power.

The example systems and computing devices described herein are merely examples suitable for some implementations and are not intended to suggest any limitation as to the scope of use or functionality of the environments, architectures and frameworks that can implement the processes, components and features described herein. Thus, implementations herein are operational with numerous environments or architectures, and may be implemented in general purpose and special-purpose computing systems, or other devices having processing capability, and, hence, are considered machine-implemented. Generally, any of the functions described with reference to the figures can be implemented using software, hardware (e.g., fixed logic circuitry) or a combination of these implementations. The terms "module," "mechanism" or "component" as used herein generally represents software, hardware, or a combination of software and hardware that can be configured to implement pre-scribed functions. For instance, in the case of a software implementation, the term "module," "mechanism" or "component" can represent program code (and/or declarative-type instructions), such as the program code for the software tool 102, that performs specified tasks or operations when executed on a processing device or devices (e.g., CPUs or processors). The program code can be stored in one or more computer-readable memory devices or other computer storage devices. Thus, the processes, components and modules described herein may be implemented by a computer program product.

Furthermore, this disclosure provides various example implementations or embodiments, as described and as illustrated in the drawings. However, this disclosure is not limited to the implementations described and illustrated herein, but can extend to other implementations, as would be known or as would become known to those skilled in the art. Reference in the specification to "one embodiment," "particular embodiments," "this implementation," "some embodiments", or other terms of similar import, means that a particular feature, structure, or characteristic described is included in at least one implementation or embodiment, and the appearances of these phrases in various places in the specification are not necessarily all referring to the same implementation/embodiment.

Although the present disclosure has been described in connection with several embodiments, the disclosure is not intended to be limited to the specific forms set forth herein. On the contrary, it is intended to cover such alternatives, modifications, and equivalents as can be reasonably included within the scope of the disclosure as defined by the appended claims.

What is claimed is:

1. A method comprising:
receiving, by a computing system communicating with a connected network, one or more application-specific identifiers generated in response to execution of a first document-management application by the computing system;
based on the one or more application-specific identifiers, determining, by the computing system, that the first document-management application is permitted to open a protected document including encrypted content;
opening, by the computing system, the protected document in the first document-management application;
decrypting, by the computing system in response to the opening the protected document, the encrypted content included in the protected document to allow a user to view the decrypted content of the document; and
substantially concurrently with the decrypting the encrypted content and allowing the user to view the decrypted content, inserting, by the computing system, an application-specific blocking policy into a network engine to enable the network engine to block the first document-management application from accessing the connected network.

2. The method of claim 1, wherein the one or more application-specific identifiers comprise:
a process name for the first document-management application; and
a process identifier (ID) for the first document-management application.

3. The method of claim 1, wherein the network engine is a Transmission Control Protocol/Internet Protocol (TCP/IP) network engine facilitating data communication between the computing system and an IP network-based remote entity, and wherein the network comprises an IP network.

4. The method of claim 1, further comprising:
monitoring, by the computing system, a status of the protected document;
determining, by the computing system, that the protected document is closed;
de-activating, by the computing system, the application-specific blocking policy in the network engine; and
permitting the first document-management application to access the connected network.

5. The method of claim 1, further comprising:
monitoring, by the computing system, an execution status of the first document-management application;
determining, by the computing system, that the execution of the first document-management application is terminated; and
instructing, by the computing system, the network engine to discard the application-specific blocking policy.

6. The method of claim 1, further comprising:
generating, by the computing system, an alert message when the first document-management application is blocked from accessing the network.

7. A method comprising:
receiving, by a computing system, one or more application-specific identifiers generated in response to execution of a first document-management application by the computing system;
based on the one or more application-specific identifiers, determining, by the computing system, that the first document-management application is permitted to open a protected document including encrypted content;
opening, by the computing system, the protected document in the first document-management application;
decrypting, by the computing system, the encrypted content included in the protected document;
substantially concurrently with the decrypting the encrypted content, inserting, by the computing system, an application-specific blocking policy into a network engine to enable the network engine to block the first document-management application from accessing a network;
executing, by the computing system, a second document-management application while the protected document is open in the first document-management application;
permitting, by the computing system, the second document-management application to open a non-protected document that includes unencrypted content; and
enabling, by the computing system, the second document-management application to access the network while the first document-management application is blocked from accessing the network.

8. The method of claim 7, wherein each of the first and the second document-management applications is one of the following:
a word-processing application;
a slide-based presentation application;
a spreadsheet-generating application;
a Portable Document Format (PDF) file management application;
a HyperText Markup Language (HTML) document creation application; or
an application having capability to access the network without using HyperText Transfer Protocol (HTTP).

9. A method comprising:
receiving, by a computing system, one or more application-specific identifiers generated in response to execution of a first document-management application by the computing system;
based on the one or more application-specific identifiers, determining, by the computing system, that the first document-management application is permitted to open a protected document including encrypted content;
opening, by the computing system, the protected document in the first document-management application;
decrypting, by the computing system, the encrypted content included in the protected document;
substantially concurrently with the decrypting the encrypted content, inserting, by the computing system, an application-specific blocking policy into a network engine to enable the network engine to block the first document-management application from accessing a network;
monitoring, by the computing system, a status of the protected document;
determining, by the computing system, that the protected document is closed;
de-activating, by the computing system, the application-specific blocking policy in the network engine; and
permitting the first document-management application to access the network;
wherein the de-activating comprises:
generating, by the computing system, an updated application-specific access policy to permit the first document-management application to access the network;
providing, by the computing system, the updated application-specific access policy to the network engine; and
instructing, by the computing system, the network engine to replace the application-specific blocking policy with the updated application-specific access policy to permit the first document-management application to access the network.

10. A computing system comprising:
a memory storing program instructions; and
a processing unit coupled to the memory and operable to execute the program instructions, which, when executed by the processing unit, cause the computing system while communicating with a connected Internet Protocol (IP) network to:
receive one or more application-specific identifiers generated in response to execution of a first document-management application by the computing system,
based on the one or more application-specific identifiers, determine that the first document-management application is permitted to open a protected document including encrypted content,
open the protected document in the first document-management application,
decrypt the encrypted content included in the protected document in response to the opening the protected document to allow a user to view the decrypted content of the document, and
substantially concurrently with the decrypting the encrypted content and allowing the user to view the decrypted content, insert an application-specific blocking policy into a network engine to enable the network engine to block the first document-management application from accessing the connected IP network.

11. The computing system of claim 10, wherein the one or more application-specific identifiers comprise:
a process name for the first document-management application; and
a process identifier (ID) for the first document-management application.

12. The computing system of claim 10, wherein the program instructions, upon execution by the processing unit, cause the computing system to:
monitor an execution status of the first document-management application;

determine that the execution of the first document-management application is terminated; and instruct the network engine to discard the application-specific blocking policy.

13. A computing system comprising:

a memory storing program instructions; and a processing unit coupled to the memory and operable to execute the program instructions, which, when executed by the processing unit, cause the computing system to:

receive one or more application-specific identifiers generated in response to execution of a first document-management application by the computing system, based on the one or more application-specific identifiers, determine that the first document-management application is permitted to open a protected document including encrypted content, open the protected document in the first document-management application, decrypt the encrypted content included in the protected document, substantially concurrently with the decrypting the encrypted content, insert an application-specific blocking policy into a network engine to enable the network engine to block the first document-management application from an Internet Protocol (IP) network, execute a second document-management application while the protected document is open in the first document-management application, permit the second document-management application to open a non-protected document that includes unencrypted content, and enable the second document-management application to access the IP network while the first document-management application is blocked from accessing the IP network.

14. The computing system of claim 13, wherein the IP network is the Internet, and wherein each of the first and the second document-management applications is one of the following:

a word-processing application;

a slide-based presentation application;

a spreadsheet-generating application;

a Portable Document Format (PDF) file management application;

a HyperText Markup Language (HTML) document creation application; or an application having capability to access the IP network without using HyperText Transfer Protocol (HTTP).

15. A computing system comprising:

a memory storing program instructions; and a processing unit coupled to the memory and operable to execute the program instructions, which, when executed by the processing unit, cause the computing system to:

receive one or more application-specific identifiers generated in response to execution of a first document-management application by the computing system, based on the one or more application-specific identifiers, determine that the first document-management application is permitted to open a protected document including encrypted content, open the protected document in the first document-management application, decrypt the encrypted content included in the protected document, substantially concurrently with the decrypting the encrypted content, insert an application-specific blocking policy into a network engine to enable the network engine to block the first document-management application from an Internet Protocol (IP) network, monitor a status of the protected document, determine that the protected document is closed, generate an updated application-specific access policy to permit the first document-management application to access the IP network, provide the updated application-specific access policy to the network engine, and instruct the network engine to replace the application-specific blocking policy with the updated application-specific access policy so as to permit the first document-management application to access the IP network.

16. A computer program product comprising a non-transitory computer-readable medium having computer-readable program code embodied therein, the computer-readable program code adapted to be executed by a computing system communicating with a connected network to implement an operation comprising:

receiving one or more application-specific identifiers generated in response to execution of a first document-management application by the computing system;

based on the one or more application-specific identifiers, determining that the first document-management application is permitted to open a protected document including encrypted content;

opening the protected document in the first document-management application;

decrypting the encrypted content included in the protected document in response to the opening the protected document to allow a user to view content of the decrypted document; and substantially concurrently with the decrypting the encrypted content and allowing the user to view the decrypted content, inserting an application-specific blocking policy into a network engine to enable the network engine to block the first document-management application from accessing the connected network.

17. The computer program product of claim 16, wherein the operation further comprises:

monitoring a status of the protected document;

determining that the protected document is closed; and de-activating the application-specific blocking policy in the network engine to restore network access capability for the first document-management application.

18. The computer program product of claim 16, wherein the network engine is a Transmission Control Protocol/Internet Protocol (TCP/IP) network engine and the network comprises an IP network, and wherein the operation further comprises:

generating an alert message when the first document-management application is blocked from accessing the IP network.

19. A computer program product comprising a non-transitory computer-readable medium having computer-readable program code embodied therein, the computer-readable program code adapted to be executed by a computing system to implement an operation comprising:
- receiving one or more application-specific identifiers generated in response to execution of a first document-management application by the computing system;
- based on the one or more application-specific identifiers, determining that the first document-management application is permitted to open a protected document including encrypted content;
- opening the protected document in the first document-management application;
- decrypting the encrypted content included in the protected document;
- substantially concurrently with the decrypting the encrypted content, inserting an application-specific blocking policy into a network engine to enable the network engine to block the first document-management application from accessing a network;
- executing a second document-management application while the protected document is open in the first document-management application;
- permitting the second document-management application to open a non-protected document that includes unencrypted content; and
- enabling the second document-management application to access the network while the first document-management application is blocked from accessing the network.

20. The computer program product of claim 19, wherein each of the first and the second document-management applications is one of the following:
- a word-processing application;
- a slide-based presentation application;
- a spreadsheet-generating application;
- a Portable Document Format (PDF) file management application;
- a HyperText Markup Language (HTML) document creation application; or
- an application having capability to access the network without using HyperText Transfer Protocol (HTTP).

* * * * *